United States Patent [19]
Blair et al.

[11] 3,792,609
[45] Feb. 19, 1974

[54] FLOW SPLITTER

[75] Inventors: Richard F. Blair; Roger J. Hill, both of Torrance; Dan B. Le May, Palos Verdes Estates, all of Calif.

[73] Assignee: Tylan Corporation, Torrance, Calif.

[22] Filed: May 10, 1971

[21] Appl. No.: 141,897

[52] U.S. Cl. ............................................... 73/205 R
[51] Int. Cl. ................................................ G01f 1/00
[58] Field of Search .. 73/202, 205, 231; 138/40, 41, 138/43, 45, 46

[56] References Cited
UNITED STATES PATENTS

| 76,166 | 3/1868 | Cordnan | 73/231 |
|---|---|---|---|
| 2,163,730 | 6/1939 | Goetzl | 73/202 X |
| 2,604,958 | 7/1952 | Leufvenius | 138/41 X |
| 2,661,768 | 12/1953 | Novak et al. | 138/44 |
| 2,815,923 | 12/1957 | Clark | 138/41 X |
| 2,887,129 | 5/1959 | Stear | 138/43 |
| 3,071,160 | 1/1963 | Weichbrod | 138/40 |
| 3,559,482 | 2/1971 | Baker et al. | 73/202 X |

Primary Examiner—Richard C. Queisser
Assistant Examiner—Arthur E. Korkosz
Attorney, Agent, or Firm—Nilsson, Robbins, Wills & Berliner

[57] ABSTRACT

A flow splitter in which a laminar flow conduit is connected in parallel to a flow element defining large numbers of closely spaced passageways, each passageway having an effective diameter sufficiently small for assuring laminar fluid flow. Linear flowmeters are provided which include as flow restrictors: a plurality of fine mesh disks juxtaposed to obtain a predetermined pressure drop; screen material formed into a hollow, length-adjustable member; screen material spirally wound around a mandrel; and a porous plug of compressed, sintered particles.

14 Claims, 9 Drawing Figures

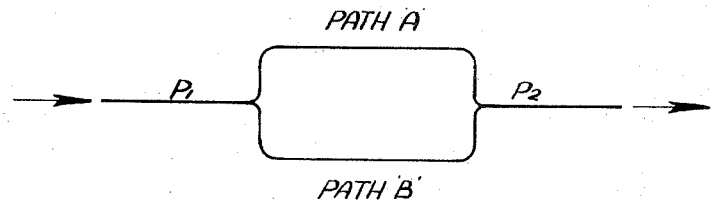
Fig. 1.
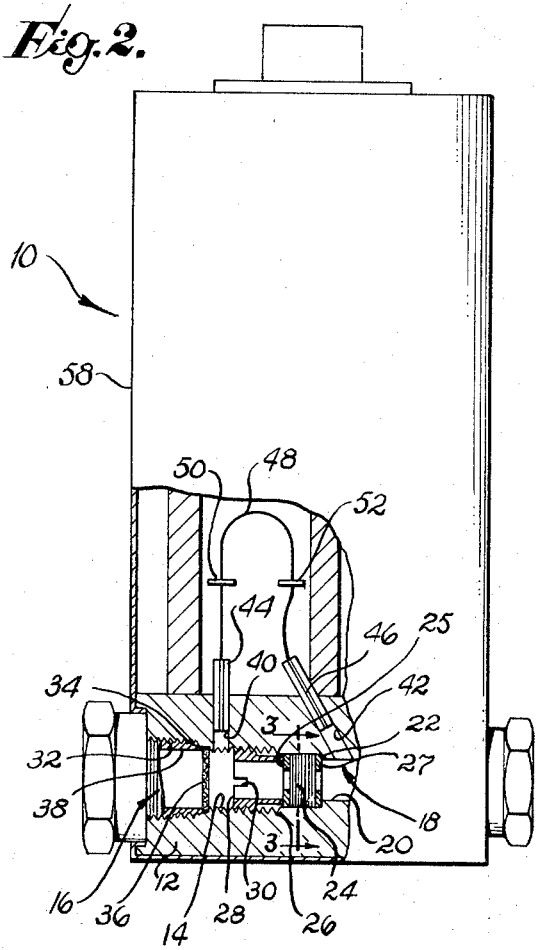
Fig. 2.
Fig. 3.
Fig. 4.
Fig. 5.
INVENTORS
RICHARD F. BLAIR
ROGER J. HILL
DAN B. LeMAY
BY THEIR ATTORNEYS
NILSSON, ROBBINS, WILLS & BERLINER

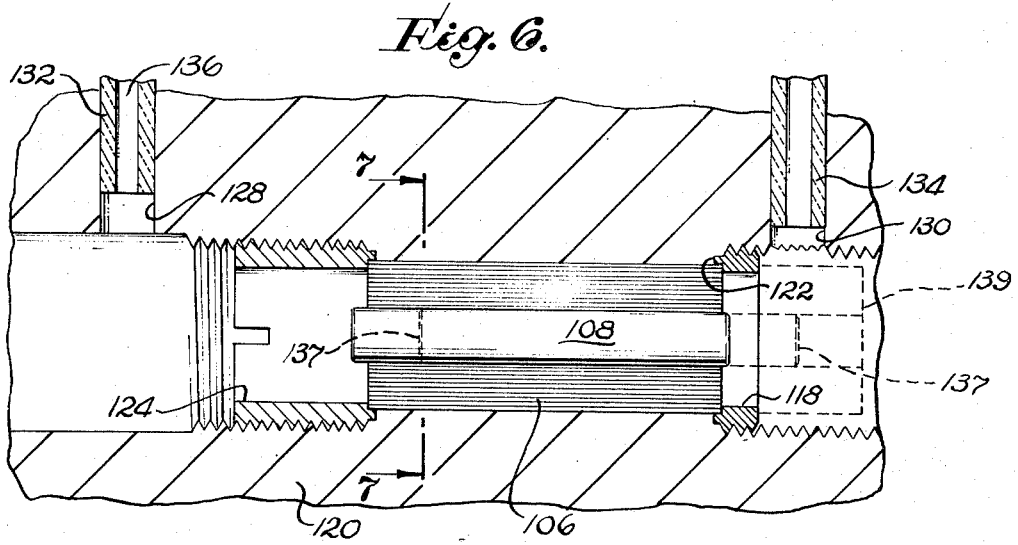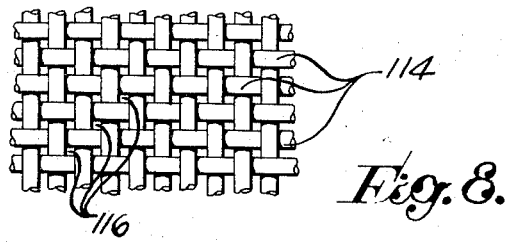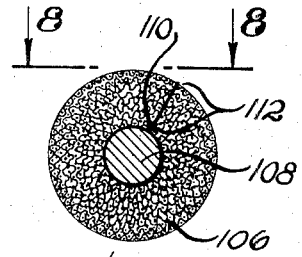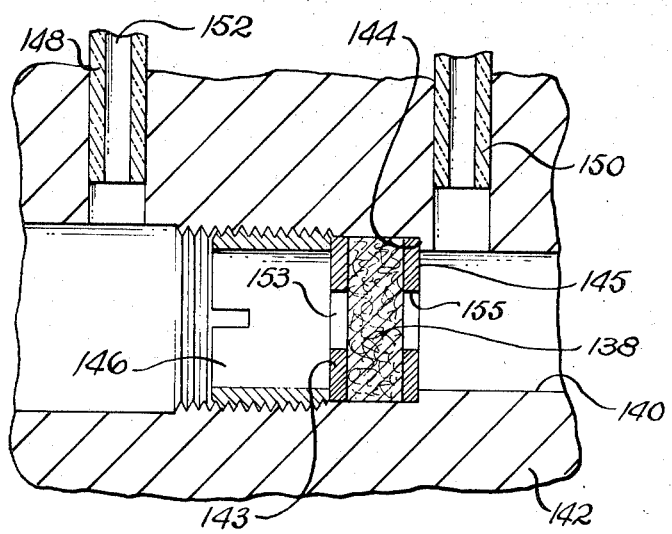

3,792,609

FLOW SPLITTER

FIELD OF THE INVENTION

The fields of art to which the invention pertains include the fields of pressure differential measuring and testing devices, flowmeters and conduit restrictors.

BACKGROUND AND SUMMARY OF THE INVENTION

The prior art has developed a variety of linear flowmeters in which a manometer or other device for measuring a pressure differential is connected across opposite sides of a flow restrictor. The restrictor comprises one or more passageways proportioned so that under normal working conditions the resistance to flow through the restrictor as a whole is substantially proportional to the rate of flow. There are certain levels of inaccuracies inherent in such devices and methods have been developed to optimize the accuracy of results obtained. See for example Goldsmith U.S. Pat. No. 3,071,001, Weichbrod U.S. Pat. No. 3,071,160, Hallanger U.S. Pat. No. 3,129,587, Kappel U.S. Pat. No. 3,027,746, Li U.S. Pat. No. 2,927,462 and Sprenkle U.S. Pat. No. 2,929,248. See also as containing disclosures pertinent hereto U.S. Pat. Nos. 3,349,619, 2,515,394, 2,132,011, 1,816,390, 1,701,805, 1,687,780, 1,178,891, 1,142,674, 1,140,548 and 163,929.

In certain applications the flow rate of a fluid is measured not by directly determining the pressure differential across a restrictor, but by measuring the actual flow of a small portion of fluid. Such applications require that the flow of the fluid be divided into two or more paths with an exact ratio maintained between the individual path flow rates. In a typical situation, such as in a mass flowmeter, a very small percentage of the flow is diverted into a measuring section. This percentage may be as small as 1 part in 40,000 and the flow measuring section is typically a very thin tubular conduit which is much longer than its diameter so that laminar flow prevails throughout the conduit. During laminar flow of a fluid, the flow rate is directly proportional to pressure drop and inversely proportional to viscosity. In contrast, during turbulent flow, the flow rate is proportional to the square root of pressure drop and largely independent of viscosity. Therefore, in the design of a flowmeter in which the flow is split along parallel paths, it is important to provide conditions that will insure laminar flow in each path. Since the measuring section flow is laminar, if the bypass flow were turbulent the flow ratio would be a function of viscosity and would have an undesirable dependency upon temperature and pressure. Such flow splitters are thus much more prone to inaccuracies as a result of geometric configuration than are pressure differential devices.

The present invention provides simple and economical methods for assuring laminar flow in both the measuring section and bypass section of a flow splitter so that a constant and predetermined ratio is maintained across the entire range of flow rates to be measured. This has been accomplished by providing a parallel circuit flow element which defines a large number of closely spaced passageways, each passageway having an effective diameter sufficiently small for assuring laminar fluid flow. Several related embodiments are disclosed, each providing a unique restrictor element utilizing screen material. In one such embodiment a plurality of fine mesh screen disks are stacked together to obtain the desired pressure drop. In another such embodiment, screen material is formed into a hollow member defining an elongate region of continuous space bounded by the screen material and means are provided for adjusting the effective length of the bounded continuous space. In still another such embodiment, screen material is spirally wound around a mandrel and secured in its wound form. In each of these embodiments the screen material is formed of strands woven to define spaces therebetween of small effective diameter relative to the thickness of the strands, thereby providing a plurality of closely spaced passageways as above referred to. In a separate embodiment, but falling within the broader aspects of the invention, the restrictor element is formed of a porous plug of compressed sintered particles. Additionally, means are provided to adjust the area normal to the flow path which means can take one form of an annular blocking member. Such adjustment members can also be utilized with the other embodiments and are particularly suitable for use with the aforementioned stacked disks.

Any of these elements may be combined with an elongate laminar flow conduit, serving as a measuring section, to constitute a linear flowmeter. Such a meter includes a housing having a fluid inlet and fluid outlet, the housing defining a fluid path between the inlet and outlet. The flow element is disposed in this fluid path to define closely spaced passageways extending in the flow direction, each in parallel circuit with the measuring section conduit. Means are provided for measuring the rate of flow of fluid through the measuring section conduit, which means are known in the prior art and constitute no part of the present invention. The result is a compact structure of simple construction which demonstrates accuracy in measurments of 1 percent or better over a substantial range of flow, temperature and pressure conditions.

BRIEF DESCRIPTION OF THE DRAWINGS

FIG. 1 is a schematic representation of the fluid flow paths in a flow divider;

FIG. 2 is a schematic illustration in cross-section of portions of a flowmeter incorporating one screen embodiment;

FIG. 3 is a view on line 3—3 of FIG. 2, in the direction of the arrows;

FIG. 4 is a schematic illustration in cross-section of portions of a flowmeter incorporating a second screen embodiment;

FIG. 5 is a view on line 5—5 of FIG. 4, in the direction of the arrows;

FIG. 6 is a schematic illustration in cross-section of portions of a flowmeter incorporating another screen embodiment;

FIG. 7 is a cross-sectional view on line 7—7 of FIG. 6, in the direction of the arrows;

FIG. 8 is a view on line 8—8 of FIG. 7, in the direction of the arrows; and

FIG. 9 is a schematic illustration in cross-section of portions of a flowmeter incorporating a porous plug embodiment.

DETAILED DESCRIPTION

As required, details of illustrative embodiments of the invention are disclosed. However, it is to be understood that these embodiments merely exemplify the invention which may take forms different from the specific illustrative embodiments disclosed. Therefore, specific structural and functional details are not necessarily to be interpreted as limiting, but as a basis for the claims.

The invention will first be described with respect to a preferred type of restrictor element, each incorporating screen material formed of strands woven to define spaces of small effective diameter relative to the thickness of the strands, as further described below and as illustrated in FIGS. 1–8. Subsequently the invention will be defined with respect to another embodiment utilizing a porous plug, as illustrated in FIG. 9.

Referring to FIG. 1, fluid paths A and B constitute the flow through a flowmeter from the inlet at $P_1$ to the outlet $P_2$. The line labeled PATH A represents fluid flow through the measuring section of the flowmeter and the line designated PATH B represents fluid flow through the bypass section of the flowmeter. The pressure drop is the same across each path. It is desired to have the flow rate in PATH A divided by the flow rate in PATH B be a constant at all times. In the particular embodiments illustrated herein, PATH A is a tube of sufficient elongation to assure laminar flow. As brought out above, PATH B must also assure laminar flow, otherwise the flow ratio would have an undesirable dependency upon temperature and pressure.

Flow through a channel may be characterized by the non-dimensional parameter known as the Reynold's number where $$R = 4m\rho V_m/u$$

where $\rho$ is the density of the fluid, $V_m$ is the mean velocity in the conduit, $u$ is the fluid viscosity and m is the hydraulic radius defined as the conduit area divided by the conduit perimeter. The effective diameter of the conduit can be considered to be $4m$. The Reynold's number expresses the ratio of the inertia forces to the viscous forces in the fluid. For low values of R, the flow is laminar, while for high values of R, inertia forces predominate and the flow tends to be turbulent. The Reynold's number transition generally occurs in the range of about 1,600 to about 2,800 Reynolds number. For any particular structure, the transition Reynold's number can be determined by noting the mean velocity at which fluid of known density and viscosity flows in a turbulent manner and applying the information to the formula set forth above. The following embodiments illustrate a number of specific structures to accomplish laminar flow in the bypass section, PATH B in combination with laminar flow in the measuring section, PATH A. Each of these embodiments provide a flow element in the fluid path through the bypass section, PATH B, defining very closely spaced fluid passageways extending in the flow direction of the fluid path. Each of the passageways has an effective diameter sufficiently small for assuring laminar fluid flow. In each of the embodiments, the fluid being measured is gaseous, but the structure and concepts are applicable to liquids as well.

Referring now to FIGS. 2 and 3, a flowmeter 10 is illustrated incorporating a flow splitter in accordance with this invention. The flowmeter includes a housing 12 bored and counterbored to define a passageway 14 formed with inlet and outlet ports 16 and 18, respectively, for the fluid whose flow is to be measured. A reduced diameter portion 20 defines an annular shoulder 22 for receiving a flow element 24 and upstream and downstream flow blocking members 25 and 27 which will be described hereinafter in more detail. A passageway region 26 upstream of the flow element 24 is threaded and receives a matingly threaded cylinder 28 which is formed with notches 30 across its far end so as to be readily threaded into the passageway 14 against the upstream blocking member 25 to secure the flow element 24 and downstream blocking member 27 in abutment with the shoulder 22. An expanded diameter passageway region 32 defines a shoulder 34 spaced from the end of the cylinder 28, for receiving a filter screen 36. The passageway region 32 is threaded and receives a matingly threaded cylindrical member 38 for abutment against the filter screen 36, securing the screen 36 in place.

Upstream and downstream taps, in the form of bore holes 40 and 42, respectively, in the housing, are provided for disposing respective insulating ends 44 and 46 of a measuring section tube 48 on opposite sides of the blocking members 25 and 27. The insulating ends 44 and 46 are tubular members through which the ends of the measuring section tube 48 are tightly secured, so that fluid flowing into the insulating ends 44 and 46 is conducted entirely through the measuring section tube 48. The measuring section tube is very thin and elongate; in this exemplary embodiment the tube 48 has an inside diameter of 0.010 inch and a length of 3.1 inches. Thermal elements 50 and 52 on the outside of the tube detect the mass flow rates of fluid passing through the tube 48. The method by which this is accomplished is known to the art and per se does not constitute a part of this invention.

The flow element 24 consists of a plurality of juxtaposed woven wire disks stacked together to create a desired pressure drop and flow rate. This particular illustration incorporates 40 disks each 0.006 inch in width. There can be as few as 1 mesh screen disk or as many as 100 or more, depending upon the desired pressure drop and capacity of the housing 12. Referring specifically to FIG. 3, each of the wire mesh disks is formed of strands of round wire 54 woven to define spaces 56 therebetween of small effective diamter relative to the thickness of the strands 54. The disks are stacked to define parallel passageways extending in the flow direction, each passageway having an effective diameter which is sufficiently small to assure laminar fluid flow. As above indicated, the desired arrangement can be obtained experimentally, or a relative rotational disposition of each of the disks can be based on calculations using the Reynold's number equation given above. In this particular illustration, the passageway is defined by the flow element 24 having effective passageway diameters of about 20 microns. The finer mesh filter 36 located upstream of the flow element 24 passes 5 micron particles and thus protects the flow element 24 from clogging from contaminants in the fluid stream.

The blocking members 25 and 27 constitute means for adjusting the effective total flow area normal to the axial flow path. In the illustration, the blocking members 25 and 27 are washers having a predetermined central opening but any blocking structure can be utilized. By inserting larger or smaller washers, the flow rate range can be modified as desired by modifying the number of passageways carrying the flow.

Flowmeter electronics are assembled in a housing 58 as known to the prior art and which are not per se a part of the invention herein.

In operation, fluid is fed into the inlet 16 whereupon it is filtered by the filter screen 36 and travels through the 20 micron bypass flow element 24, emerging from the outlet 18. A portion of the fluid stream is diverted through the measuring section tube 48, flowing therethrough to meet the emerging fluid at the outlet 18. As a result of the present configuration, flow through both the measuring section tube 48 and flow element 24 are laminar, yielding accuracy of measurement to better than one percent over a substantial range of flow, temperature and pressure conditions.

Referring now to FIGS. 4 and 5, a flowmeter 60 is illustrated of somewhat different construction. The flowmeter inlcudes a housing 62 having a passageway 64 bored therethrough including an inlet 66 and outlet 68 on opposite sides thereof. An annular groove 70 is formed in the passageway 64 in which is disposed a ring member 72. The ring member 72 is secured to the flanged bottom 75 of a hollow cylindrically shaped member 74 which extends downstream of the ring 72 in the direction of fluid flow and secures the flanges bottom 75 against a shoulder 77 formed in the passageway 64.

Referring specifically to FIG. 5, the cylindrical member 74 is defined by screen material formed into the hollow cylindrical shape, the screen material being welded at its flanged bottom end 75 to the ring 72. As in the case of the screen material constituting the flow element 24, the cylinder 74 is constructed of screen material which is formed of strands 76 woven to define spaces 78 therebetween of small effective diameter relative to the thickness of the strands 76 so that many closely spaced fluid passageways are formed, each passageway having an effective diameter sufficiently small for assuring laminar fluid flow. The cylindrical shape defines an elongate region of continuous space bounded by screen material. The downstream ends 80 of the cylindrical screen element 74 is closed by a close fitting cylindrical plug 82 which can be moved into the cylindrical screen 74 to adjust the effective length of the bounded continuous space therein. Adjustment can be provided by means of a tube having a blocked end, or other baffle, in place of the plug 82. By forming the screen into a cylindrical shape, a large flow area is obtained in a relatively small place.

A filter 84 of finer mesh than the screen 74 material is secured in the passageway 64 spaced from the ring 72, secured against a shoulder 86 formed in the passageway 64 by means of a threaded member 88 matingly engaged with threads formed in the passageway upstream of the filter 84.

Taps, in the form of bore holes 90 and 92 in the housing 62 are provided on opposite sides of the ring 72 for receiving the insulating ends 94 and 96 of a measuring section tube 98, equipped with thermal elements 100 and 102, all in accordance with the similar construction described with respect to FIG. 2. Also as previously indicated, flowmeter electronics are contained in a casing, shown schematically at 104.

In operation, fluid is fed into the inlet 66, through the fine mesh screen 84 and into the hollow cylindrical flow element 74, whereupon it emerges from the sides thereof through the passageway 64 into the outlet 68. A small portion of the flow is diverted through the measuring section 98 and emerges to join with the effluent of the flow element 74. The rate of flow can be adjusted by moving the plug 82 further into the hollow cylindrical screen 74 to change the capacity thereof. This construction allows a larger flow rate range than obtainable with the structure of FIG. 2, and a flow rate range that is adjustable as indicated.

Referring now to FIGS. 6, 7 and 8, there is illustrated details of a flow element 106 which can be substituted for the flow element 24 or 74. Screen material, which can be identical to the screen material of the elements 24 and 74, is spirally wrapped around a steel rod mandrel 108. Referring specifically to FIG. 7, after the first two layers of screen material are wrapped around the mandrel rod 108, the layers are spot welded, leaving the mandrel rod 108 free to slide. Subsequently, as each layer is wound around the prior layer, it is spot welded to the prior layer so that the resultant structure has a line of spot welds 112 closely spaced along the length of the element 106. Referring specifically to FIG. 8, the screen material is the same as that depicted in FIGS. 3 and 5, formed of strands 114 woven to define spaces 116 therebetween of sufficiently small effective diameter relative to the thickness of the strands so that laminar flow is obtained. Fluid flows through the wire matrix in an axial direction. However, the wire size and spacing determines the passage Reynold's number in the same manner as it does for fluid flow normal to the screen material.

Referring specifically back to FIG. 6, the flow element 106 is disposed within a reduced diameter portion of a threaded passageway 118 formed in a flowmeter housing 102 and is secured between the shoulders of a retainer ring 122 and a retainer tube 124 threaded within the passageway 118 on opposite sides of the element 106. A pair of bore holes 128 and 130 are formed on opposite sides of the tube and ring 124 and 122 into which are disposed the opposite insulated ends 132 and 134 of a measuring section tube 136, all in substantial accordance with the configurations described hereinabove with respect to FIGS. 2 and 4.

Two methods are available for modifying the flow rate range of the embodiment. In one method, the mandrel rod 108 is partially withdrawn, as shown by the dashed lines 137, to permit a portion of the axial length to be bypassed by a portion of the flow which enters the element in a radial direction with a shorter effective average flow path length. In another method, the retainer ring 122 is removed and the element 106 is partially withdrawn from the enclosing housing 120 so as to uncover a portion of its external surface, as shown by the dashed lines 139, to shorten the effective length of the flow path.

Referring now to FIG. 9, an embodiment is illustrated in which the flow restrictor element is a porous plug 138. The plug 138 is disposed within a passageway 140 formed in a flowmeter housing 142 and secured between washers 143 and 145 against an annular passageway shoulder 144 by means of a threaded retainer tube 146. The plug 138 and washers 143 and 145 are disposed between the insulated opposite ends 148 and 150 of a measuring section tube 152, all in substantial accordance with the disposition of the elements and washers depicted in FIG. 1. The plug 138 comprises a plurality of small particles, e.g., stainless steel particles, which are sintered to form a porous plug. For example, one can use a 15–25 micron stainless steel fluid filter sold by the Asco Sintering Corporation, Los Angeles, Calif. A wide variety of other porous plugs of stainless steel, and plugs of ceramic materials, and the like, are commercially available and can be chosen to yield the pressure drop desired. The washers 143 and 145 have central openings 153 and 155, respectively, of predetermined size so as to define a desired flow rate range, as referred to above with respect to FIG. 1.

We claim:

1. A linear flowmeter, comprising:
   a housing having a fluid inlet and a fluid outlet defining a first fluid path therebetween;
   a flow element in said first fluid path comprising a plurality of fine mesh disks juxtaposed to obtain a predetermined pressure drop thereacross and defining a plurality of closely spaced fluid passageways having effective diameters sufficiently small for assuring laminar fluid flow;
   an elongate conduit defining a laminar flow second fluid path;
   means for measuring the rate of flow of fluid through said conduit;
   means for connecting said second fluid path in parallel with said first fluid path on opposite flow sides of said flow element; and
   means for adjusting the effective length of said first fluid path whereby to obtain a predetermined pressure drop across said second fluid path.

2. A linear flowmeter comprising:
   a housing having a fluid inlet and a fluid outlet defining a first fluid path therebetween;
   a flow element in said first fluid path, comprising a plurality of disks, each formed of strands woven to define spaces therebetween of small effective diameter relative to the thickness of said strands, said disks being juxtaposed to obtain a plurality of closely spaced fluid passageways having effective diameters sufficiently small to obtain laminar flow under a predetermined pressure drop thereacross;
   an elongate conduit defining a laminar flow second fluid path;
   means for measuring the rate of flow of fluid through said conduit;
   means for connecting said second fluid path in parallel with said first fluid path on opposite flow sides of said flow element; and
   means for adjusting the effective length of said first fluid path whereby to obtain a predetermined pressure drop across said second fluid path.

3. A linear flowmeter, comprising:
   a housing having a fluid inlet and a fluid outlet defining a first fluid path therebetween;
   a flow element in said first fluid path, comprising screen material defining closely spaced fluid passageways having effective diameters sufficiently small for assuring laminar fluid flow, said screen material being formed into a hollow member defining an elongate region of continuous space bounded by said screen material;
   an elongate conduit defining a laminar flow second fluid path;
   means for measuring the rate of flow of fluid through said conduit;
   means for connecting said second fluid path in parallel with said first fluid path on opposite flow sides of said flow element; and
   means for enabling the effective length of said bounded continuous space to be changed.

4. The flowmeter according to claim 3 in which said enabling means comprises means for adjusting the effective length of said bounded continuous space.

5. The flowmeter of claim 4 in which said screen material is formed of strands woven to define spaces therebetween of small effective diameter relative to the thickness of said strands.

6. The flowmeter according to claim 5 in which said member comprises a hollow cylinder open at both ends and said adjusting means comprises a plug at one end which is movable in said cylinder.

7. The flowmeter according to claim 3 in which said screen material is formed into a hollow cylinder elongate in said flow direction and having an open downstream end, and including a plug in said end which is movable in said cylinder to adjust the effective length of said cylinder.

8. A linear flowmeter, comprising:
   a housing having a fluid inlet and a fluid outlet defining a first fluid path therebetween;
   a flow element in said first fluid path, comprising screen material closely spirally wound transverse of said flow direction, said screen material being formed of strands disposed to define spaces therebetween of small effective diameter relative to the thickness of said strands to define closely spaced fluid passageways having effective diameters sufficiently small for assuring laminar fluid flow, and including means for securing said screen material in said spirally wound form;
   an elongate conduit defining a laminar flow second fluid path;
   means for measuring the rate of flow of fluid through said conduit; and
   means for connecting said second fluid path in parallel with said first fluid path on opposite flow sides of said flow element.

9. The flowmeter according to claim 8 including means for adjusting the flow area normal to said fluid path whereby to modify the number of said passageways directly in said fluid path.

10. The flowmeter according to claim 8 in which said screen material is wound around a mandrel.

11. The flowmeter according to claim 10 including means for adjusting the effective length of said fluid path.

12. A linear flowmeter, comprising:
   a housing having a fluid inlet and a fluid outlet defining a first fluid path therebetween;
   a flow element in said first fluid path, comprising a plurality of small particles compressed and sintered to form a rigid, cylindrical porous plug defining closely spaced fluid passageways having effective diameters sufficiently small for assuring laminar fluid flow;
   an elongate conduit defining a laminar flow second fluid path;
   means for measuring the rate of flow of fluid through said conduit; and
   means for connecting said second fluid path in parallel with said first fluid path on opposite flow sides of said flow element.

13. In a flowmeter having means for measuring the rate of fluid flow through an elongate conduit, the improvement comprising:

means for defining a first fluid path;

an elongate conduit in operative association with said fluid flow rate measuring means and defining a laminar flow second fluid path;

a flow element in said first fluid path comprising a plurality of disks, each formed of strands woven to define spaces therebetween of small effective diameter relative to the thickness of said strands, said disks being juxtaposed to obtain a predetermined pressure drop thereacross and defining a plurality of closely spaced fluid passageways having effective diameters sufficiently small for assuring laminar fluid flow;

means for connecting said second fluid path in parallel with said first fluid path on opposite flow sides of said flow element; and means for adjsuting the effective length of said first fluid path whereby to obtain a predetermined pressure drop across said second fluid path.

14. In a flowmeter having means for measuring the rate of fluid flow through an elongate conduit, the improvement comprising:

a flow element in said first fluid path comprising screen material formed into a hollow member defining an elongate region of continuous space bounded by said screen material, and including means for adjusting the effective length of said bounded continuous space; and means for connecting said second fluid path in parallel with said first fluid path on opposite flow sides of said flow element.

* * * * *